(12) United States Patent
Van Phan et al.

(10) Patent No.: US 11,974,238 B2
(45) Date of Patent: Apr. 30, 2024

(54) TIME-SYNCHRONIZED RADIO BEARER FOR SUPPORTING PRECISION TIMING PROTOCOL (PTP) BASED TIME SENSITIVE NETWORK (TSN) APPLICATIONS

(71) Applicant: Nokia Technologies Oy, Espoo (FI)

(72) Inventors: Vinh Van Phan, Oulu (FI); Jani Moilanen, Helsinki (FI); Ling Yu, Kaunianinen (FI); Peter Rost, Heidelberg (DE); Rakash Sivasiva Ganesan, Unterhaching (DE); Vladimir Vukadinovic, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 646 days.

(21) Appl. No.: 16/973,876

(22) PCT Filed: Jun. 19, 2019

(86) PCT No.: PCT/FI2019/050473
§ 371 (c)(1),
(2) Date: Dec. 10, 2020

(87) PCT Pub. No.: WO2019/243669
PCT Pub. Date: Dec. 26, 2019

(65) Prior Publication Data
US 2021/0204230 A1     Jul. 1, 2021

Related U.S. Application Data

(60) Provisional application No. 62/687,989, filed on Jun. 21, 2018.

(51) Int. Cl.
*G05B 19/4155*     (2006.01)
*H04J 3/06*     (2006.01)
(Continued)

(52) U.S. Cl.
CPC ...... *H04W 56/001* (2013.01); *G05B 19/4155* (2013.01); *H04J 3/0667* (2013.01);
(Continued)

(58) Field of Classification Search
CPC ......... G05B 19/02–46; G05B 2219/10–50401; H04J 3/06–076; H04L 67/12–125;
(Continued)

(56) References Cited

U.S. PATENT DOCUMENTS

| | | | |
|---|---|---|---|
| 2015/0120012 A1* | 4/2015 | Dickie | G05B 19/056 |
| 2015/0271730 A1* | 9/2015 | Benammar | H04W 36/14 |
| 2017/0142770 A1* | 5/2017 | Fu | H04W 76/15 |

FOREIGN PATENT DOCUMENTS

| | | |
|---|---|---|
| CN | 101447861 A | 6/2009 |
| CN | 104507156 A | 4/2015 |

(Continued)

OTHER PUBLICATIONS

Chu, Junsheng, et al., "Analysis on the standardization of networking technology used in Industrial Internet", Telecommunications Network Technology No. 11, Oct. 20, 2017, 30-36.

(Continued)

*Primary Examiner* — Timothy J Weidner
(74) *Attorney, Agent, or Firm* — Harrington & Smith

(57) ABSTRACT

Systems, methods, apparatuses, and computer program products for supporting precision timing protocol (PTP) based time sensitive network (TSN) applications are provided. One method includes configuring, by a network node, a user equipment connection and user contexts for an industrial automation and control (IAC) system or configuring at least one time synchronized radio bearer for a user equipment. The method may also include determining synchronization configuration on the at least one time synchronized radio bearer for the industrial automation and control
(Continued)

(IAC) system, and distributing the synchronization configuration periodically or on a need basis to one or more serving network nodes for the industrial automation and control (IAC) system.

6 Claims, 10 Drawing Sheets

(51) Int. Cl.
| | |
|---|---|
| *H04L 69/00* | (2022.01) |
| *H04W 4/70* | (2018.01) |
| *H04W 28/02* | (2009.01) |
| *H04W 56/00* | (2009.01) |
| *H04W 76/10* | (2018.01) |
| *H04W 80/02* | (2009.01) |
| *H04W 84/02* | (2009.01) |
| *H04W 88/02* | (2009.01) |
| *H04W 88/08* | (2009.01) |
| *H04W 88/12* | (2009.01) |
| *H04W 92/02* | (2009.01) |
| *H04W 92/10* | (2009.01) |
| *H04W 92/12* | (2009.01) |

(52) U.S. Cl.
CPC .............. *H04L 69/26* (2013.01); *H04W 4/70* (2018.02); *H04W 28/0268* (2013.01); *H04W 76/10* (2018.02); *G05B 2219/31229* (2013.01); *H04W 80/02* (2013.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01)

(58) Field of Classification Search
CPC ........ H04L 69/26–28; H04W 4/40–70; H04W 8/18–245; H04W 28/02–26; H04W 48/02–20; H04W 56/0005–0095; H04W 72/02–569; H04W 74/002–0891; H04W 76/10–50; H04W 80/02–12; H04W 84/005–22; H04W 88/005–188; H04W 92/02–24
See application file for complete search history.

(56) References Cited

FOREIGN PATENT DOCUMENTS

| CN | 105577349 A | 5/2016 |
|---|---|---|
| WO | WO-2015/066385 A2 | 5/2015 |
| WO | WO 2016/023589 A1 | 2/2016 |
| WO | WO 2017/054891 A1 | 4/2017 |
| WO | WO 2017/063322 A1 | 4/2017 |
| WO | WO-2017/171621 A1 | 10/2017 |

OTHER PUBLICATIONS

Pop, Paul, et al., "Enabling Fog Computing for Industrial Automation Through Time-Sensitive Networking (TSN)", IEEE Communications Standards Magazine, Jun. 2018, pp. 55-61.

"3rd Generation Partnership Project; Technical Specification Group Radio Access Network; Evolved UTRA and UTRAN; Radio Access Architecture and Interfaces (Release 7)" 3GPP TR R3.018 V0.6.0, pp. 100-164, Oct. 2006.

"LTE; Evolved Universal Terrestrial Radio Access (E-UTRA) and Evolved Universal Terrestrial Radio Access Network (E-UTRAN); Overall description; Stage 2 (3GPP TS 36.300 version 14.6.0 Release 14)", ETSI TS 136 300 V14.6.0, paragraph 6.3 pp. 79-80; paragraphs 15-15.2 pp. 160-164; paragraph 15.3.7 p. 170; Apr. 2018.

3GPP TSG RAN WG1 Meeting #91, Reno, USA, Nov. 27-Dec. 1, 2017, R1-1719414, "Discussion on over-the-air time synchronization for URLLC", Huawei, HiSilicon, 3 pgs.

3GPP TSG RAN WG1 Meeting #92bis, Sanya, China, Apr. 16-20, 2018, R1-1804429, "Discussion on the motivation of High Accuracy Time Synchronization of URLLC", Huawei, HiSilicon, 7 pgs.

\* cited by examiner

TIME-SYNCHRONIZED RADIO BEARER FOR SUPPORTING PRECISION TIMING PROTOCOL (PTP) BASED TIME SENSITIVE NETWORK (TSN) APPLICATIONS

CROSS REFERENCE TO RELATED APPLICATION

This patent application is a U.S. National Stage application of International Patent Application Number PCT/FI2019/050473 filed Jun. 19, 2019, which is hereby incorporated by reference in its entirety, and claims priority to U.S. provisional application 62/687,989 filed Jun. 21, 2018, which is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to the synchronization of devices in such systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method that may include setting up and configuring, by a network node, a UE connection and user contexts for an IAC system and/or configuring at least one time synchronized radio bearer for a UE. The method may also include determining synchronization configuration for the IAC system or for the user equipment and, distributing the synchronization configuration periodically or on a need basis to one or more serving gNB(s) for the IAC system or for the user equipment. The synchronization configuration may include the initial reference timing and/or configured synchronized timing granularity for the PDCP level synchronization. The method may also include distributing the synchronization configuration to one or more impacted UEs.

Another embodiment may be directed to an apparatus that may include at least one processor and at least one memory comprising computer program code. The at least one memory and computer program code may be configured, with the at least one processor, to cause the apparatus at least to set up and configure a UE connection and user contexts for an IAC system and/or configure at least one time synchronized radio bearer for a UE. The at least one memory and computer program code may be further configured, with the at least one processor, to cause the apparatus at least to determine synchronization configuration for the IAC system or for the user equipment and, distribute the synchronization configuration periodically or on a need basis to one or more serving gNB(s) for the IAC system or for the user equipment. The synchronization configuration may include the initial reference timing and/or configured synchronized timing granularity for the PDCP level synchronization. The at least one memory and computer program code may be further configured, with the at least one processor, to cause the apparatus at least to distribute the synchronization configuration to one or more impacted UEs.

Another embodiment may be directed to a method that may include determining, by a network entity, whether to provide time synchronized radio bearer(s) with PDCP level time synchronization for a UE and/or across UEs of an IAC system, for example depending on the IAC system related user contexts. According to some embodiments, the method may include providing at least one time synchronized radio bearer for a UE of PTP based TSN used for the industrial automation and control system. The method may also include selecting a network entity to provide the master PDCP synchronization source for the configured time synchronized radio bearer(s) in serving UEs of the IAC system. The method may then include configuring the selected network entity to host the master PDCP synchronization source.

Another embodiment may be directed to an apparatus that may include at least one processor and at least one memory comprising computer program code. The at least one memory and computer program code may be configured, with the at least one processor, to cause the apparatus at least to determine whether to provide time synchronized radio bearer(s) with PDCP level time synchronization for a UE and/or across UEs of an IAC system, for example depending on the IAC system related user contexts. According to some embodiments, the at least one memory and computer program code may be configured, with the at least one processor, to cause the apparatus at least to provide at least one time synchronized radio bearer for a UE of PTP based TSN used for the industrial automation and control system. The at least one memory and computer program code may be further configured, with the at least one processor, to cause the apparatus at least to select a network entity to provide the master PDCP synchronization source for the configured time synchronized radio bearer(s) in serving UEs of the IAC system, and to configure the selected network entity to host the master PDCP synchronization source.

In an embodiment, the at least one time synchronized radio bearer may be a bi-directional radio bearer that may terminate at PDCP layer or on a layer above, such as SDAP. According to certain embodiments, the master PDCP synchronization source may provide a synchronization timing reference to synchronize PDCP peers and peer-to-peer communications of the time synchronized radio bearer in time. In an embodiment, delay on the time synchronized radio bearer is controlled so that the bi-directional time synchronized radio bearer provides a symmetric and deterministic link for E2E TSN communication.

According to certain embodiments, the configuring of the at least one time synchronized radio bearer may include determining a radio bearer configuration for the time synchronized radio bearer, where the radio bearer configuration may include one or more of QoS class profile, RLC mode, PHY access mode or channel mapping, HARQ operation and transport format, which can be flexible and optimized for needed QoS and, optionally, optimized for the PDCP-level ToP-based synchronization.

In some embodiments, the selecting of the master PDCP synchronization source may include selecting a master PDCP synchronization source for serving the IAC system on an as needed basis and specific to the IAC system being served. According to certain embodiments, a PDCP timing reference may be determined and distributed to an involved serving gNB. For example, in an embodiment, the timing reference is available at a PDCP peer and PDUs may be delivered based on the timing reference derived at PDCP level through the time synchronized radio bearer or L1 information. Also, in an embodiment, the timing reference may be delivered to the application (e.g., IAC application).

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for supporting precision timing protocol (PTP) based time sensitive network (TSN) applications, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
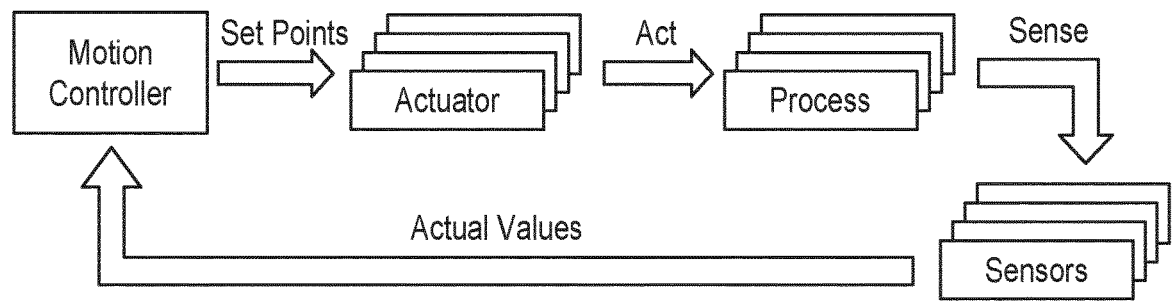
FIG. 1 illustrates a block diagram showing example technical characteristics of motion-control use cases.

Certain embodiments may be directed to 5G support for challenging industrial automation and control (IAC) use cases, such as motion control ones. In such cases, applications running in a number of devices belonging to the same IAC system are strictly synchronized and controlled by a master or central server with high-precision timing in order to ensure correct operation of the belonging IAC system. For motion control, the 5G system should support a very high synchronicity between a communication group of approximately 50-100 UEs in the order of 1 μs or below. End-to-end (E2E) communications required for IAC systems are considered as highly time sensitive and need high reliability. In some challenging closed-loop control applications that rely on cyclic communication, such as motion control, E2E Ultra Reliable and Low Latency Communication (URLLC) with extremely low packet delay jitter is needed to meet short cycle time requirements. FIG. 1 depicts a block diagram illustrating some of the technical characteristics of motion-control use cases.

In order to provide needed networking and communication support for IAC systems, IEEE 802.1 time sensitive network (TSN) has emerged as a popular technology. TSN refers to the IEEE 802.1Q defined standard technology to provide deterministic messaging on standard Ethernet. TSN technology is centrally managed and delivers guarantees of delivery and minimized jitter using time scheduling for those real-time applications that require determinism. TSN is a Layer 2 technology. The IEEE 802.1Q standards work at OSI Layer 2. TSN is an Ethernet standard, rather than an Internet Protocol (IP) standard. The forwarding decisions made by the TSN bridges use the Ethernet header contents, not the IP address. The payloads of the Ethernet frames can be anything and are not limited to IP. This means that TSN can be used in any environment and can carry the payload of any industrial application.

TSN is a technology that is focused on time, and was developed to provide a way to make sure information can travel from point A to point B in a fixed and predictable amount of time. TSN stream or flow is a term used to describe the time-critical communication between end devices. Each stream has strict time requirements that the networking devices honor. Each TSN stream is uniquely identified by the network devices. End devices are the source and destinations of the TSN streams. The end devices run an application that requires deterministic communication. These are also referred to as talkers and listeners.

Timing and synchronization in IEEE 802.1 TSN is based on IEEE 802.1AS-Rev standard, which will define a profile of IEEE 1588 precision time protocol (PTP) applicable in the context of IEEE Std 802.1Q. The IEEE 1588 PTP provides a standard method to synchronize devices on a network with sub-microsecond precision. The protocol synchronizes slave clocks to a master clock ensuring that events and timestamps in all devices use the same time base, and is optimized for user-administered, distributed systems, minimal use of network bandwidth, and low processing overhead.

TSN applications (TSN AP) require guaranteed link-level data transport with extremely low loss, bounded low latency, and low latency jitter. Traditionally, radio links were not able to provide any of those. Furthermore, PTP-based synchronization used in TSN assumes latency-symmetric links, which is usually the case with wired, but not with wireless links (PTP provides means to account for delay asymmetry, but does not define methods for the estimation of asymmetry). Certain embodiments therefore enable a new type of LTE/5G radio bearer (RB) named Time-Synchronized Radio Bearer (TS-RB), which provides low latency jitter and symmetric uplink/downlink latency and is therefore better suited for PTP-synchronized TSN applications than legacy RBs.

Figure 2:
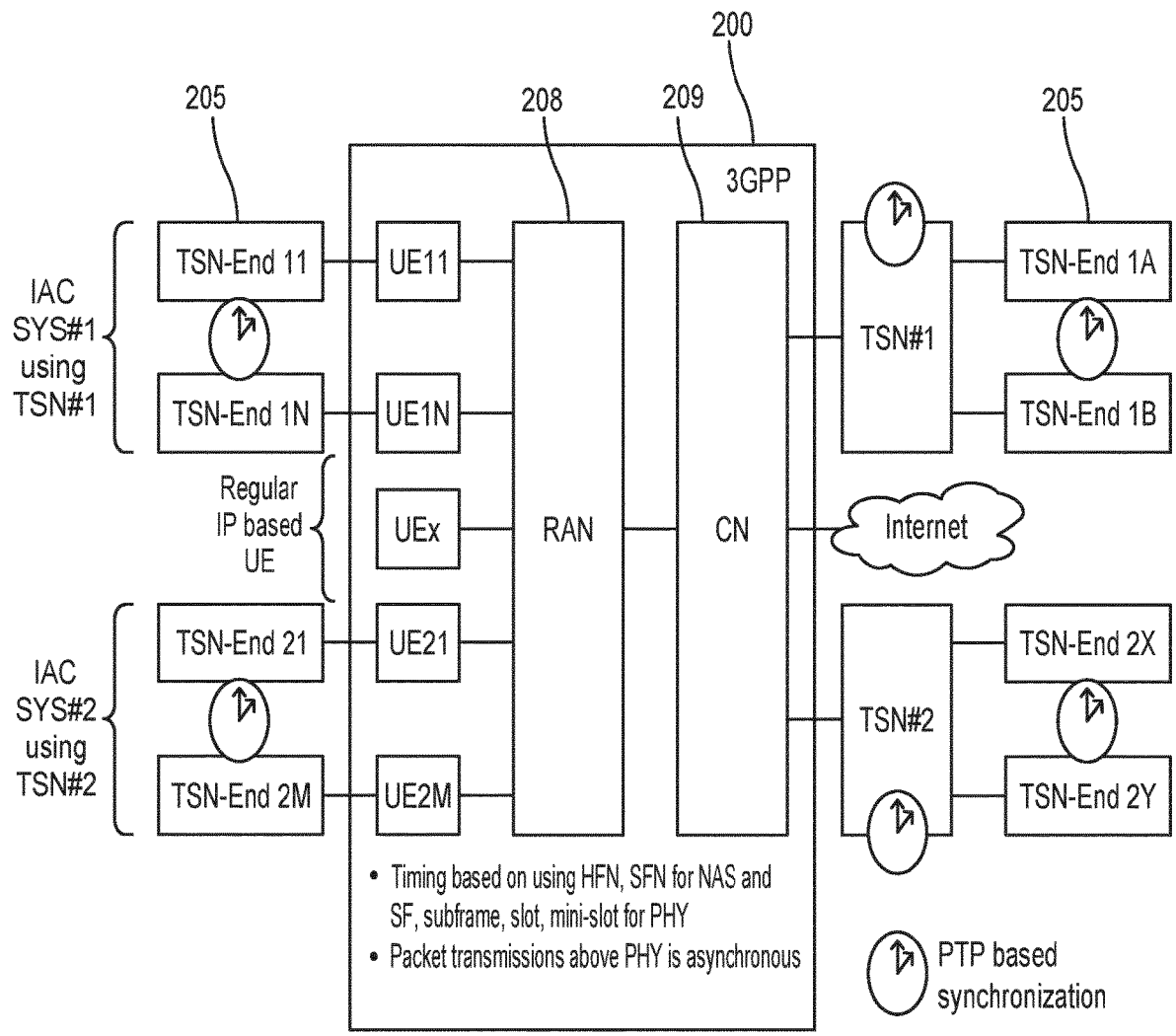
FIG. 2 illustrates an example in which 3GPP network provides radio connectivity for TSN end users.
Figure 3:
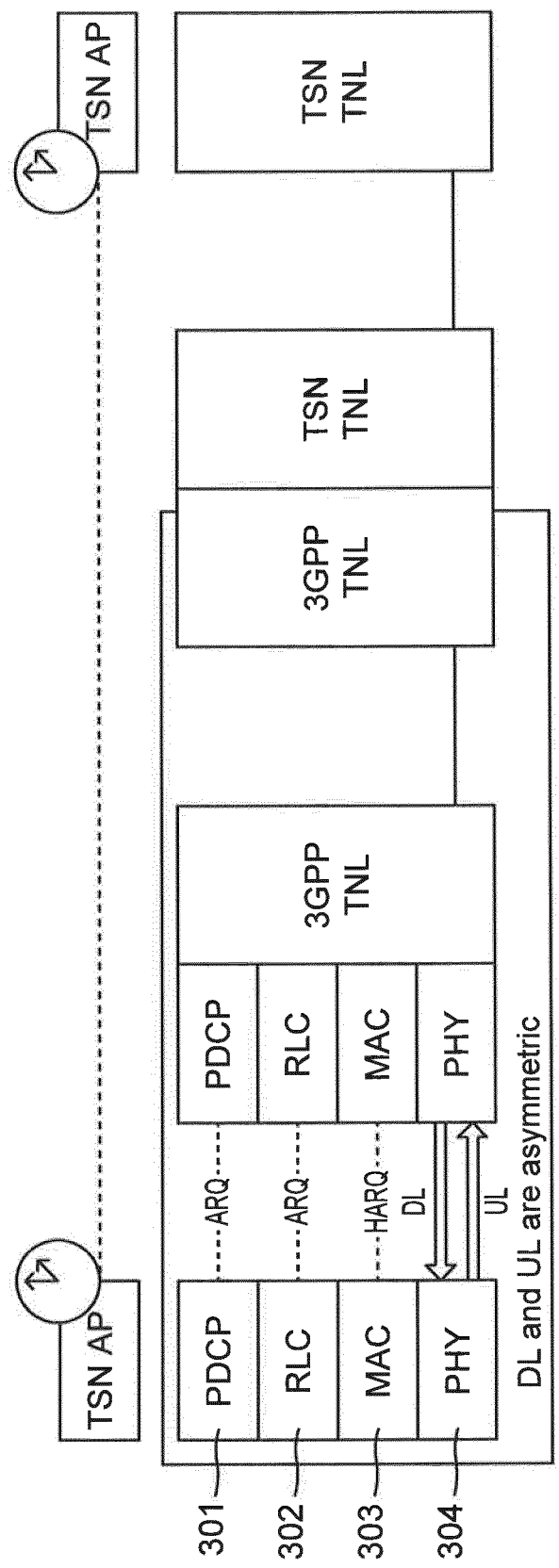
FIG. 3 illustrates a 3GPP protocol view in user plane (U-plane)

FIGS. 2 and 3 illustrate an example of high-level radio connectivity support of a 3GPP network for PTP-synchronized TSN and an application thereof. More specifically, FIG. 2 depicts an example in which 3GPP network 200 provides radio connectivity for TSN end users 205. FIG. 3 depicts a 3GPP protocol view in user plane (U-plane). Packet data convergence protocol (PDCP) 301 is assumed as the upper-most sublayer of the L2 radio link protocol, as shown in FIG. 3. PDCP peer entities originate and terminate a configured RB. This may be applicable for both LTE and 5G, even though 5G RAN may also adopt an additional sublayer on top of PDCP 301 called Service Data Adaptation Protocol (SDAP).

Current mobile cellular networks are based on the principle of providing radio access connection to mobile users for various internetworking applications and services. The radio access connection is provided separately and handled independently from transport and application level E2E connection, following the model of separating between access stratum (AS) and non-access stratum (NAS) and between radio access network (RAN) 208 and core network (CN) 209. There is no strict timing synchronization of U-plane packet transmissions or on NAS level for control plane (C-plane). The radio transmissions between a UE and serving RAN are synchronized for transmitter (Tx)/receiver (Rx) radio operations on physical layer (PHY) 304 and up to lower medium access control (MAC) 303 for L1 transport blocks on the basis of predefined subframe or transmission time interval (TTI) for uplink (UL) and downlink (DL) separately depending on the duplexing technique of radio access technology (RAT) used such as frequency division duplex (FDD) or time division duplex (TDD). There is no strict timing for data transmissions of L2 protocol data units (PDUs) on upper MAC, radio link control (RLC) 302 and PDCP 301, except for expected events being guarded with predefined corresponding timers which are on the order of tens of milliseconds. NAS level signalling and timer operation between UE and CN for C-plane may adopt some system timing resolved using, e.g., system frame number (SFN) and hyper frame number (HFN) as in LTE, for instance. Thus, the current mobile cellular network, however capable, has not yet been facilitated to support synchronized E2E applications of a distributed IAC system which should have anticipated events synchronized across a number of devices over the distributed IAC system with precision, for example, on the order of 1 μs or below.

In order to enable LTE and 5G radio access networks to support highly time sensitive and synchronized E2E communications of a distributed IAC system, there is a need to ensure that the RB service, up to PDCP level, does not cause any excessive delay, delay jitter, or delay asymmetry that may compromise the upper layer (i.e., PTP-based) synchronization imposed on E2E communications over the distributed IAC system. Some of the technical issues to be considered include: hybrid automatic repeat request (HARQ) (and ARQ) retransmissions, E2E synchronization, and device distribution. HARQ (and ARQ) retransmissions adopted in RAN may cause notable delay and delay jitter for PDCP PDUs considering a single UE as well as across a number of UEs of an IAC system. For example, a HARQ round trip time (RTT) of at least 3 TTIs is added to the delay of impacted PDCP packet at the receiver side per each needed HARQ retransmission of the transmission block (TB) carrying the impacted PDCP packet. In a case where UE1 does not need any retransmission to get a PDCP packet and UE2 needs 2 retransmissions to get a PDCP packet, then UE1 may deliver the PDCP packet to the application layer earlier by at least 6 TTIs compared to that of UE2. E2E synchronization behind IEEE 802.1 TSN is based on PTP, assuming symmetric E2E connection. This may not be taken for granted over the cellular access considering expectable differences of UL and DL transmissions, in a FDD based RAN for instance. Furthermore, as devices of a IAC system may be distributed over a large enough local service area of the IAC system, more than one gNB may be involved in serving the devices of the IAC system and synchronization across all the devices in this case further requires coordination between all the involved serving gNBs.

Therefore, certain embodiments described herein provide a method to enable and facilitate that a cellular access network for a UE that requires PTP-synchronized E2E time-sensitive networking of IAC systems, such as provided by IEEE 802.1 TSN, is sufficiently symmetric and deterministic in terms of latency for two-way synchronized E2E communication. One embodiment provides time synchronization between end-points (e.g., PDCP or SDAP entities) of a radio bearer (RB), and across a multitude of RBs, for delivering certain service data units (SDUs) towards the application layer at the UE side for DL and at the gNB side for UL for all relevant UEs of an IAC system being served by an LTE or 5G network. This is in order to ensure that the packet delay of the radio access link up to a PDCP level can be synchronized whenever needed for PTP based TSN, is symmetric and deterministic in both UL and DL directions for an individual UE as well as group of UEs, and is adapted to actual requirements of the belonging TSN and IAC system. An embodiment may compensate for UL/DL delay asymmetricity and delay jitter caused by, for example, fronthaul transport, radio propagation, possible radio retransmissions at lower layers (MAC and RLC), or reception diversities (MIMO and multi-connectivity). According to an embodiment, the PDCP-level time synchronization may be specific to a certain RB or a group of RBs, which may be referred to as time-synchronized RBs (TS-RBs), configured and controlled by the serving network to relevant UEs of the IAC system which may be triggered by either the UE side or the network side.

Figure 4:
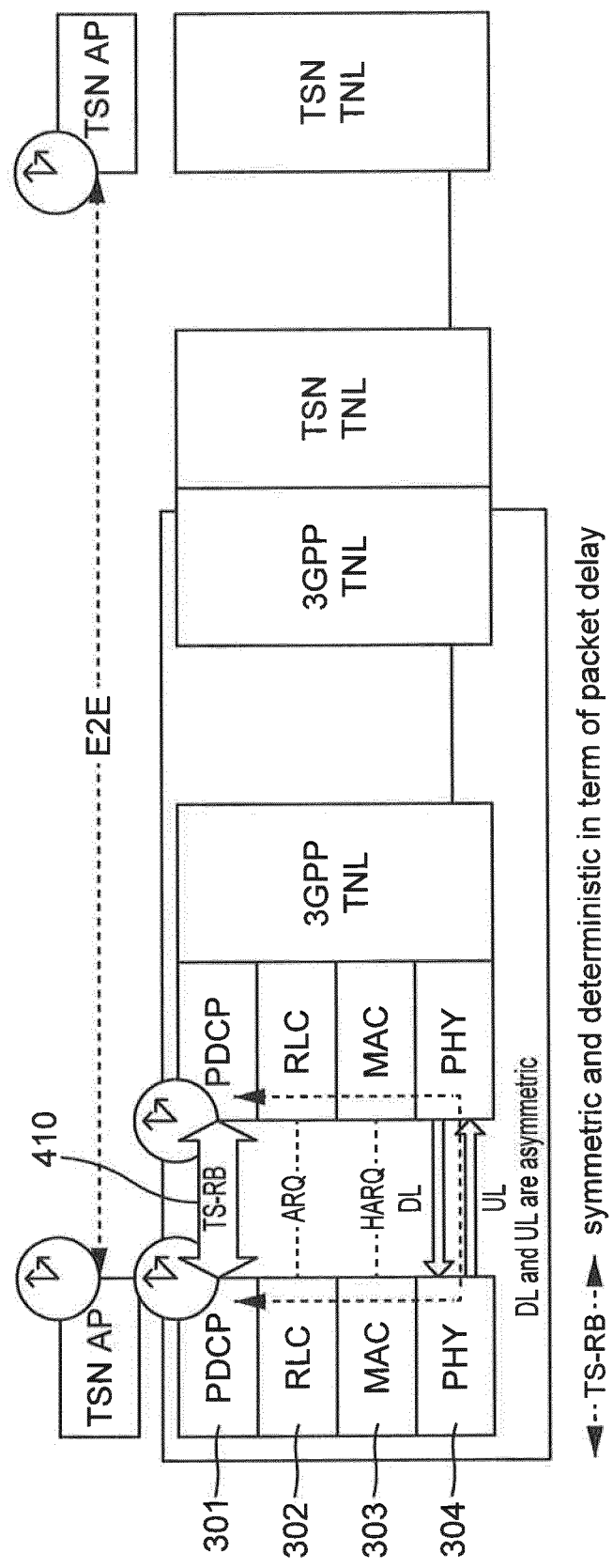
FIG. 4 illustrates a block diagram depicting an example embodiment with a new bi-directional radio bearer.

FIG. 4 illustrates a block diagram depicting an example embodiment. As illustrated in the example of FIG. 4, certain embodiments introduce a new type of bi-directional RB, which may be referred to herein as a TS-RB 410. In the example of FIG. 4, TS-RB 410 may terminate at PDCP 301 or on a layer above, such as at SDAP.

According to certain embodiments, PDCP peers and peer-to-peer communications of TS-RB 410 may be synchronized in time with a synchronization timing reference provided by a PDCP synchronization source selected by the serving network for an individual UE or for a group of UEs belonging to the same IAC system and TSN thereof. Therefore, this may be specific to the IAC system being served and on the need basis. The synchronization between PDCP peers of a TS-RB 410 can be realized through signaling on an additional radio bearer that is highly reliable and avoids the use of processes that may introduce variable delay (e.g., HARQ, ARQ). In an embodiment, PDCP-level signaling procedure may use PDCP control-type protocol data units (C-PDUs) for time-of-packet (ToP) based synchronization of TS-RB between an individual UE and serving gNB. Some embodiments may utilize PDCP-level control signaling from the transmitting PDCP peer to ensure that the dispatching time of a certain PDCP SDU toward upper layer at the receiving PDCP peer can be controlled and, if needed, synchronized properly for an individual UE as well as across the targeted group of UEs belonging to the same IAC system. This may be realized, for example, by using an additional L1 control channel or PDCP C-PDU for some alternatives.

Thus, according to certain embodiments, the following steps may be followed for setup and reconfiguration of a TS-RB. A RB configuration may be determined for TS-RB including, for example, QoS class profile, RLC mode, PHY access mode or channel mapping, HARQ operation and transport format, which can be flexible and optimized for needed QoS and, optionally, optimized for the PDCP-level ToP-based synchronization. Optionally, a RB configuration may be determined for an additional RB including, for instance, QoS class profile, RLC mode, PHY access mode including multi-antenna parameters (e.g., including distributed antenna systems) or channel mapping, HARQ operation and transport format optimized, preferably simplified, for the PDCP-level ToP-based synchronization of the TS-RB. The master PDCP synchronization source may be selected for serving the IAC system on a need basis and thus specific to the IAC system being served. A PDCP timing reference may be determined and distributed to an involved serving gNB. Certain embodiments may include performing PDCP-level ToP based signaling procedures for synchronization between PDCP peers of a TS-RB, and performing PDCP-level control signaling for SDU scheduling at the receiving PDCP of the TS-RB, which can be realized by using an additional L1 control channel or PDCP C-PDU for some alternatives. The result is to control the delay on TS-RB, so that the bi-directional TS-RB provides a symmetric and deterministic link for E2E TSN communication.

Figure 6:
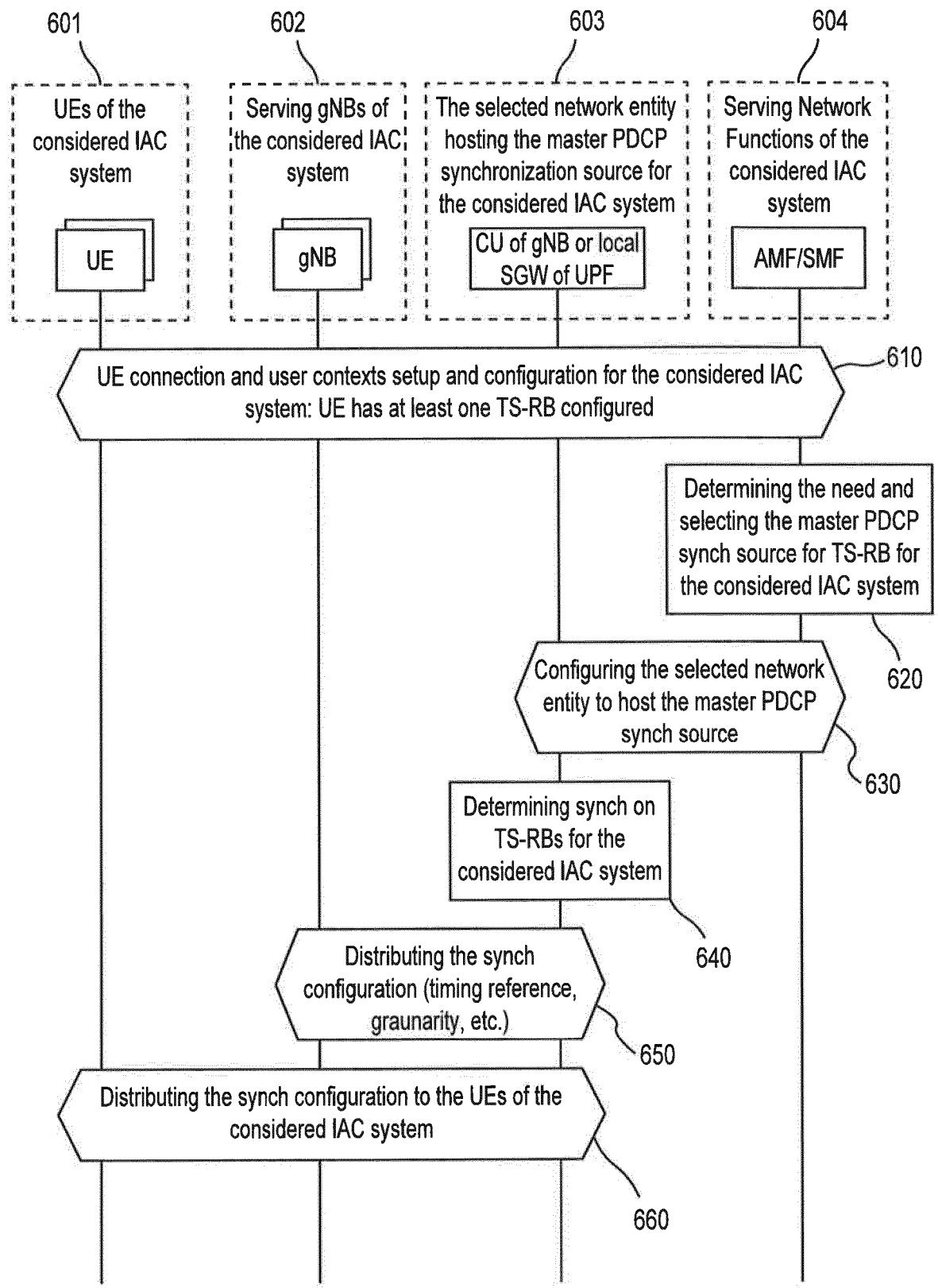
FIG. 6 illustrates an example signaling diagram, according to one embodiment.

FIG. 6 illustrates an example signaling diagram depicting a selection of the master PDCP synchronization source and a distribution and configuration of the initial timing reference and synchronized timing granularity for the PDCP level synchronization, according to certain embodiments.

According to an embodiment, a serving RAN, which may include one or more neighbouring cell(s) or gNB(s) 602, has sufficient awareness of an IAC system that requires application level synchronization with specified timing precision across identified UE device(s) 601 of the IAC system being served. In an embodiment, at 610, UE connection and user contexts are setup and configured for the considered IAC system, and UE 601 has at least one TS-RB configured. In certain embodiments, this may be facilitated by having the IAC system related user contexts specified and kept at the serving RAN, initiated and managed along with radio connection setup and reconfiguration of individual UEs belonging to the same IAC system, starting from the first activated UE. In some embodiments, the serving RAN may be informed of the IAC system related user contexts by either a UE 601, AMF 604 or both.

In some embodiments, the IAC system related user contexts may include one or more of a unique ID of the IAC system common to all impacted UEs of the same IAC system, required timing precision for E2E application level synchronization across all impacted UEs, communication characteristics of expected synchronized events such as a predefined ID of the protocol, sizes of the messages used for E2E communications corresponding to an expected event, periodicity of events, etc. Service requirements of the IAC system and UEs thereof may also be configured to the serving RAN in terms of QoS parameters. The IAC system may come with a PTP based TSN, as illustrated in FIG. 2. Hence, the IAC system related user contexts may include or be represented by the contexts of PTP and TSN flows, and corresponding UEs as TSN end devices. In this regard, QoS requirements of an individual TSN flow can be incorporated and mapped on some proper QoS profile of the serving network configured for a corresponding TS-RB, for instance. That is, proper QoS class(es) and corresponding QoS class identifier(s) (QCI(s)) may be provided for setting up and configuring TS-RB(s) to serve TSN flow(s) of the IAC system.

In an embodiment, depending on the IAC system related user contexts, at 620, the serving network 604 may decide if it is needed to provide the TS-RB with PDCP level time synchronization for an individual UE, as well as across all impacted UEs 601, of the IAC system or not. According to some embodiments, this decision can be made dynamically on the basis of individual TSN flows and UEs as TSN end devices, according to QoS requirements mapped on QCI and/or QoS parameters thereof. However, in one embodiment, at least one TS-RB may be provided for an individual UE of PTP based TSN, configured for at least PTP flow and the like, which can be coordinated and commonly configured across a targeted group of individual UEs belonging to the same IAC system. In certain embodiments, a common ID may be defined and configured for that at least one TS-RB across the targeted UE group. The common ID can be a LCID or a C-RNTI, for example.

Then, an AMF or SMF 603, for instance, may select and/or configure, at 630, a network entity 603 to provide the master PDCP synchronization source for all configured TS-RBs in serving UEs of the IAC system. In some embodiments, the selected network entity 603 may be a serving gNB or a local serving gateway as part of UPF via SMF, for example, as the serving gNB is hosting PDCP peers of TS-RBs for at least some of relevant UEs or the serving local gateway of UPF is directly interfacing with the TSN of the IAC system. However, the selected network entity 603 can also be a C-plane network entity or NF in 5G, such as AF enhanced to support TSN based IAC applications.

In an embodiment, master synchronization source may, at 640, determine synchronization on TS-RBs for the considered IAC system. The master synchronization source of TS-RBs may then distribute, at 650, the initial reference timing as well as configure the synchronized timing granularity for the PDCP level synchronization periodically or on a need basis to all the involved serving gNB for the IAC system.

Figure 5:
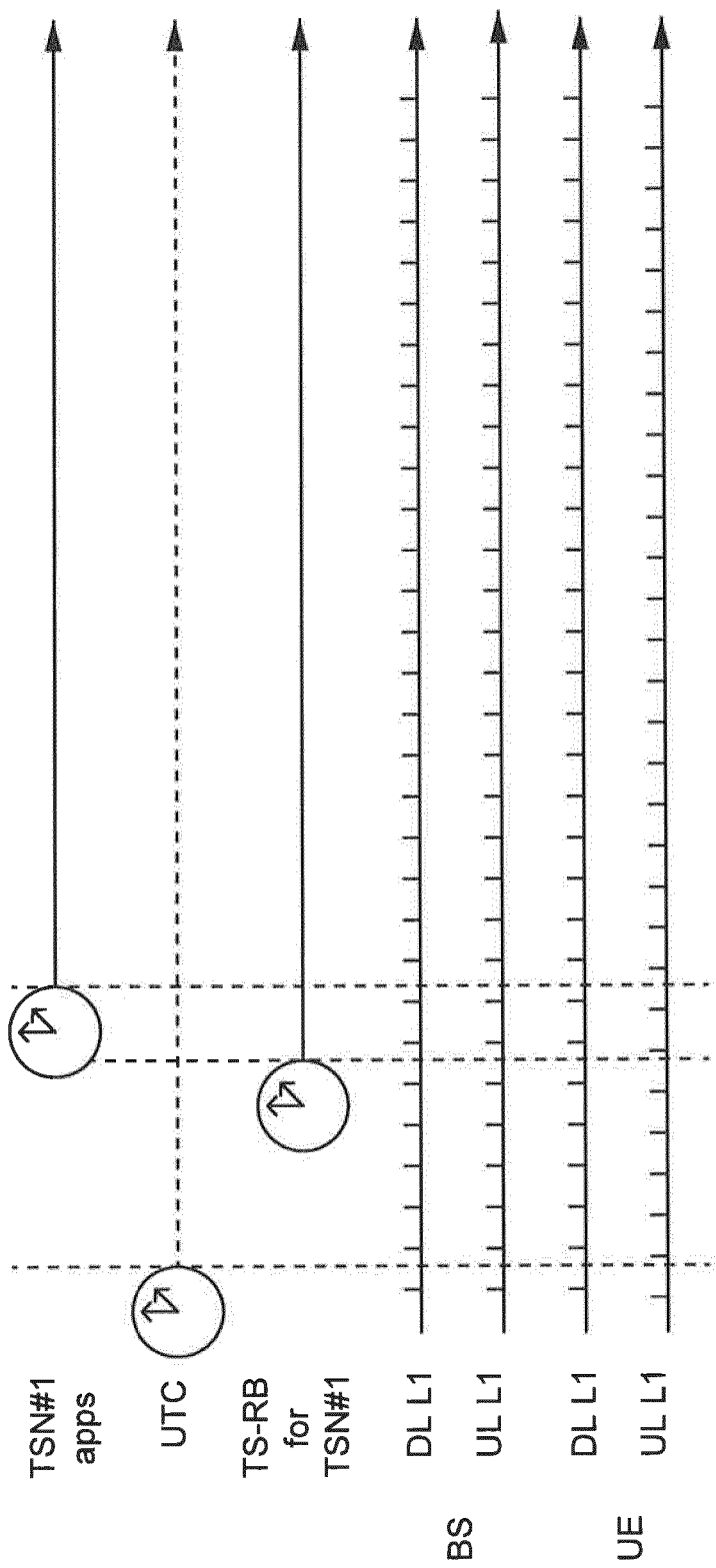
FIG. 5 illustrates examples of different timing synchronization on different levels of protocol stacks, according to some example embodiments.

According to some embodiments, a PDCP may be hosted at a shared central unit (CU) at the network side for impacted UE(s) or a shared local serving gateway which can directly interface with, e.g., the TSN network connecting the central controlling server and other remote users of the IAC system selected as the master source. This may be advantageous for the following reasons: (1) to ease the network side synchronization across all the PDCP peer-entities of the impacted UEs; and/or (2) to align the reference timing for PDCP level time synchronization to the timing of the TSN network directly. Furthermore, the master source of TS-RBs may be specific to the individual IAC system or specific to the serving RAN, which may be serving more than one IAC system. That is, it is up to the serving network to use the same or different master clock for TS-RBs of different IAC systems. FIG. 5 illustrates examples of different timing synchronization on different levels of protocol stacks, according to some example embodiments.

It is noted that certain embodiments are not limited to the use of a common master source. Indeed, there may be other options to synchronize PDCP, for example based on how RAN synchronization is implemented. The following options may be considered, as examples: (1) If distributed units (DUs) or real-time baseband units (rtBBUs) of gNB are synchronized from the backhaul, i.e., from a Grandmaster (GM) residing in CN, then this GM may also be used as the PDCP synchronization source for all central units (CUs) or non-real-time BBU (nrtBBUs); (2) If DUs are synchronized from the midhaul, i.e., from GNSS-equipped CUs, then the local GNSS receiver may be used as a PDCP sync source for a CU (no master, but they all trace back to the same GNSS time source); (3) If DUs uses local GNSS receivers as sync sources, a DU may provide this time reference to its CU to be used as synchronization source for TS-RBs ending at UEs served by that particular DU (no master is elected, but they all trace back to the same GNSS time source); or (4) If DUs are synchronized from switched fronthaul, i.e., from a local GM residing in a fronthaul switch, then this local GM may be used as synchronization source for TS-RBs ending at UEs served by those DUs. In general, some embodiments allow for the possibility that even on the same CU, TS-RBs may use different synchronization sources as long as those trace back to the same reference with sufficient accuracy.

It should be noted that L1 synchronization between UE and BS is already highly precise. However, this kind of radio synchronization requires constant transmission/reception of synchronization reference signals as well as related system information update from the BS (serving RAN) as well as between the BS and the UE for keeping track of, e.g., {HFN, SFN, sub-frame, slot and mini-slot numbers} of the serving RAN. Therefore, it may be more flexible for synchronization between the serving RAN and the UE on higher layers including PDCP to use its own configurable absolute timing and timing granularity which can be specific for a service session or TS-RB across all relevant UEs and involved serving cells of the same IAC system. Additionally, L1 packet transmission and reception are strictly on the TTI basis which can be a sub-frame, a slot or a mini-slot. This is not applied for higher-layer packet transmission and reception in general.

In an embodiment, the serving gNB 602 may further distribute, at 660, the reference timing and synchronized timing granularity for the PDCP level synchronization to all the impacted UEs 601 being served by the gNB. In some embodiments, this may be realized using either RRC signalling in C-plane or PDCP signalling over individual TS-RBs or additional RBs established for the purpose of TS-RB synchronization in U-plane or L1 mechanism like timing advance (TA). It is noted that PDCP level synchronization is specific to the kind of TS-RB and user service thereof and not needed in general, considering legacy RB services for example. As a result, certain embodiments consider TS-RB as on U-plane. However, other embodiments may have TS-RB on C-plane. It is further noted that L1 synchronization across different cells may be supported in MBMS SFN of LTE, for instance. In some embodiments, MBSFN-RS may be used to compensate for the DL Physical Multicast Channel (PMCH) transmitted during MBSFN subframes. This kind of SFN timing may be utilized for the reference timing of TS-RB as well, in addition to other options mentioned above.

In an embodiment, PDCP level ToP based signalling procedures are introduced for adjusting PDCP level synchronization and which may be tailored for serving the required E2E synchronization of an IAC system. It is noted that, according to certain embodiments, one option is to use RRC signalling, and another option is to use U-plane signalling by exchanging PDCP C-PDUs over the configured TS-RB with proper QoS fulfilling URLLC related requirements of the IAC system.

Figure 7:
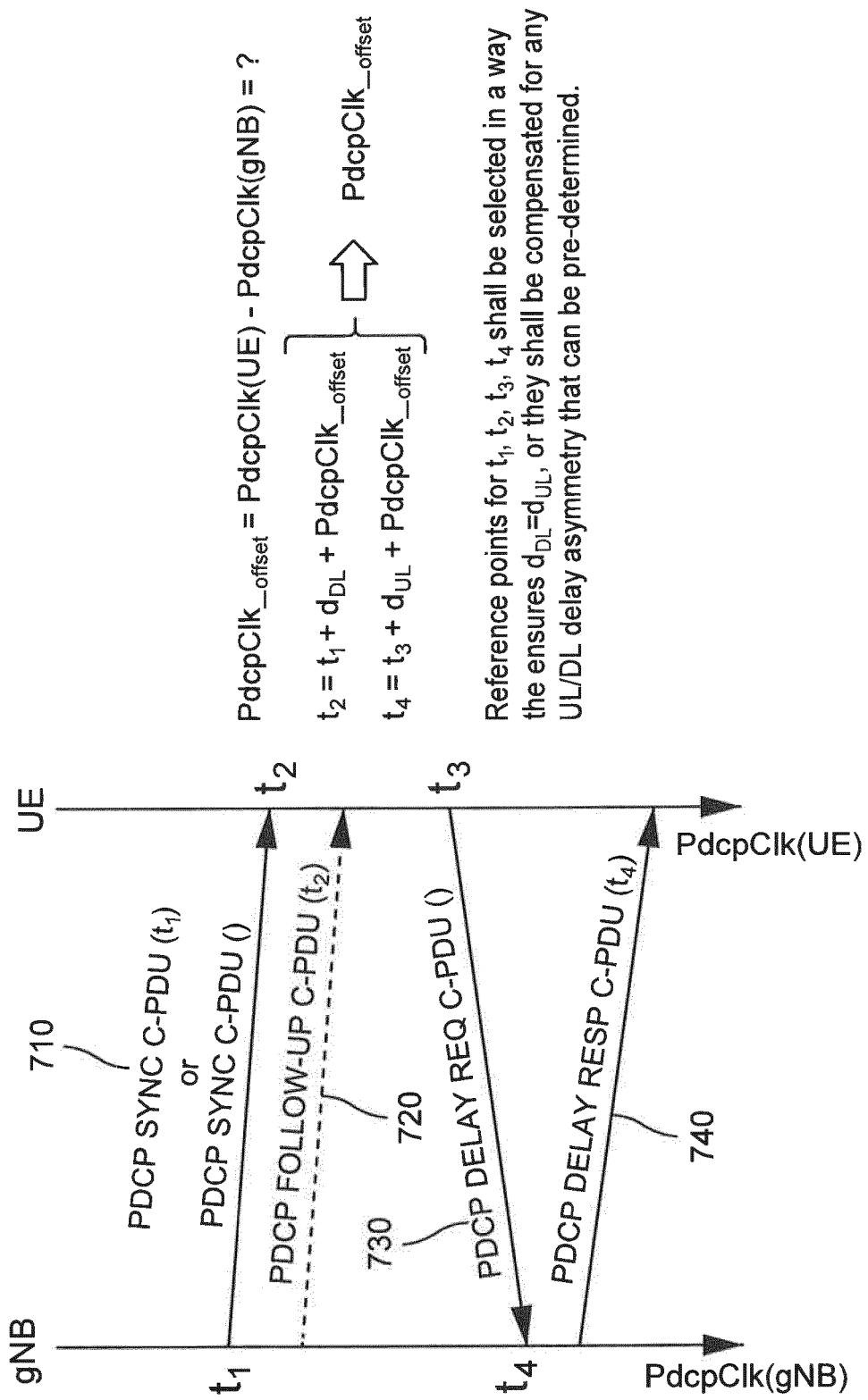
FIG. 7 illustrates an example signaling diagram, according to an embodiment.

FIG. 7 illustrates an example signaling diagram depicting PDCP level ToP based signalling procedures between an impacted UE and the serving gNB. As illustrated in the example of FIG. 7, at 710, a C-PDU carrying the timestamp t1 of the C-PDU at the serving gNB according to the timing configured for the TS-RB is sent to the UE side over the corresponding RB (a configured TS-RB of the UE applied for the related service of the IAC system or an additional RB established for the purpose of TS-RB synchronization). The timestamp t1 may correspond to an arbitrary point in the C-PDU processing pipeline, set to make the UL/DL asymmetry compensation as easy as possible. In one example, the timestamp t1 can be sent in a follow-up message 720. In an embodiment, a reference point for t1 may be selected on L2rt or below to rule out the (unpredictable) L1 latency, for example at some point where hardware timestamping can be done, e.g., eCPRI interface.

According to one embodiment, the serving gNB may set t1 adjusted by an offset determined to compensate for the pre-determined or configured UL/DL delay asymmetry and, optionally, for the timing difference between the TSN and the PDCP timing reference. As one example, consider that a single HARQ transmission per a TB per a SDU of the TS-RB is adopted. L1 DL transmission of a TB takes 1 TTI and L1 UL transmission of a TB takes 3 TTIs, and TTI can be flexible and adapted to the precision needed for the TS-RB. L2 ARQ is not applied on the TS-RB. In this example, in order to compensate for the UL-DL difference the serving gNB may adopt an offset of 2 TTIs on top of the actual sending time at the gNB. In general, the serving gNB may determine the deterministic offset depending on the transmission mode configured to the UE for UL transmission on the TS-RB.

In an example embodiment, the UE may be configured to take into account possible random or eventual delay due to, e.g., lower layer retransmissions (HARQ) or diversities (MC) and then adjust t1 in accordance with preconfigured offset for the TS-RB. As an example, consider that up to 3 synchronous HARQ transmissions per a TB per a SDU of the TS-RB is adopted for both UL and DL. L2 ARQ is not applied on the TS-RB. In this example, the UE may be able to determine whether the C-PDU is received on the first or second or third HARQ transmission based on, e.g., indication from the corresponding HARQ process at the UE side. The UE is configured to compensate for t1 by adding the configured time difference between UL and DL transmission of 3 synchronous HARQ plus L2 processing delays thereof.

As further illustrated in the example of FIG. 7, at 730, the UE may initiate a delay request C-PDU to the gNB and expects, at 740, a response C-PDU carrying the timestamp t4 of the request C-PDU at the gNB from the gNB. In an embodiment, the UE may optionally indicate some UE assistant information to the gNB in the request 730, such as delta between the application level synchronization related timing (PTP or TSN and the PDCP level synchronization related timing at the UE side), and/or the processing timing of receiving the above proposed C-PDU carrying t1 at the serving gNB. The gNB may be configured to determine a compensated receiving time of the request C-PDU to be included in the response C-PDU 740. The compensated receiving time may be adjusted and compensated for, e.g., possible retransmission delay of lower layers as in previous examples, and also with possible offset to eliminate overall UL/DL asymmetric impact, as described with the PDCP SYNCH C-PDU.

In some embodiments, L1 synchronization on individual cell basis or multi-cell basis like MBMS SFN may be utilized. In this case, the serving g/eNB may determine and configure the UE to align the time reference for PDCP level synchronization with the provided L1 synchronization, as noted above. It is noted that the UL may need to be compensated for with timing advance of the UE.

Certain embodiments may provide methods to control packet delay variation on TS-RB. For PDCP packet transmission over TS-RB, at least the following options may be considered. In one option, the PDCP peer at the network side may buffer a DL packet (SDU of PTP for example) for a predetermined amount of time to compensate for PDCP level UL-DL delay asymmetry, taking into account, e.g., the preconfigured synchronous HARQ and UL-DL packet delays at lower layers as illustrated above. In another option, the PDCP peer at the UE side may be configured to buffer and dispatch a DL packet (SDU of PTP for example) towards application with a deterministic and symmetric delay over TS-RB.

In an embodiment, in order to assist in synchronizing PDCP level packet dispatching of a certain PDCP SDU from PDCP to upper layer at receiving side of a TS-RB for individual UE or across all the impacted UEs, several alternatives may be provided. For example, one option is that the PDU header of PDCP D-PDU of the targeted TS-RB may carry the timing information for dispatching the SDU carried in the payload of the D-PDU. This may be applied for DL and the timing information is determined by the serving network. Another option is that the PDCP C-PDU may carry the timing information, i.e., synchronized timing for dispatching the SDU from PDCP to upper layer is sent prior to the D-PDU carrying the actual SDU. In a further option, L1 control channel, kind of MCCH, may tell the timing information for the targeted TS-RB service common to all impacted UEs. In yet another option, the dispatching time may be derived from PDCP sequence number and information provided in PDCP C-PDU.

According to some embodiments, the serving gNB may adopt one of the above options depending on actual QoS requirements imposed on the corresponding RB. In certain cases of URLLC, if the required latency over the radio link is on the range of the required jitter, then there may be no need for the gNB to adopt any of the above options.

Figure 8:
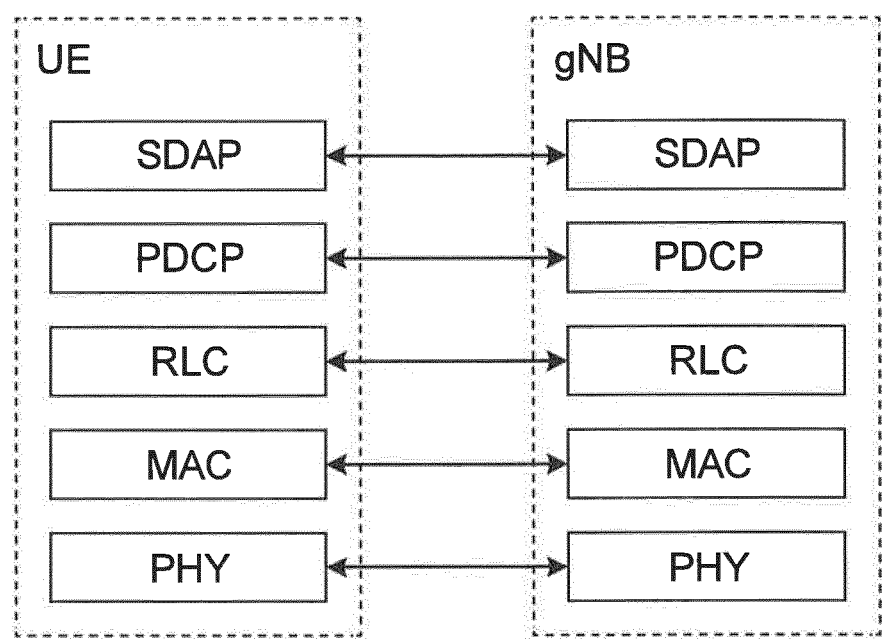
FIG. 8 illustrates an example of a U-plane radio protocol stack of 5G RAN, according to some embodiments.

As mentioned in the foregoing, a U-plane radio protocol stack of 5G RAN may also include a Service Data Adaptation Protocol (SDAP) sublayer, as illustrated in FIG. 8. The main services and functions of SDAP may include mapping between a QoS flow and a data radio bearer, and marking QoS flow ID (QFI) in both DL and UL packets. One peer-to-peer SDAP entity may be configured for each individual PDU session. The dispatching time to upper layers outside 3GPP may be implemented by SDAP. Therefore, certain embodiments described above may be implemented on SDAP level as well. In this case, it is likely that individual UE of the same IAC system is served with a single PDU session for that IAC system. Hence, the need for synchronization across more than one RB per UE per an IAC system may not be there. Furthermore, as SDAP is the upper-most layer of AS directly interfacing with transport or higher layers towards application (AP) layer in 5G, SDAP may be a reasonable place to terminate timing and synchronization issues towards AP.

Figures 9A, 9B, 9C:
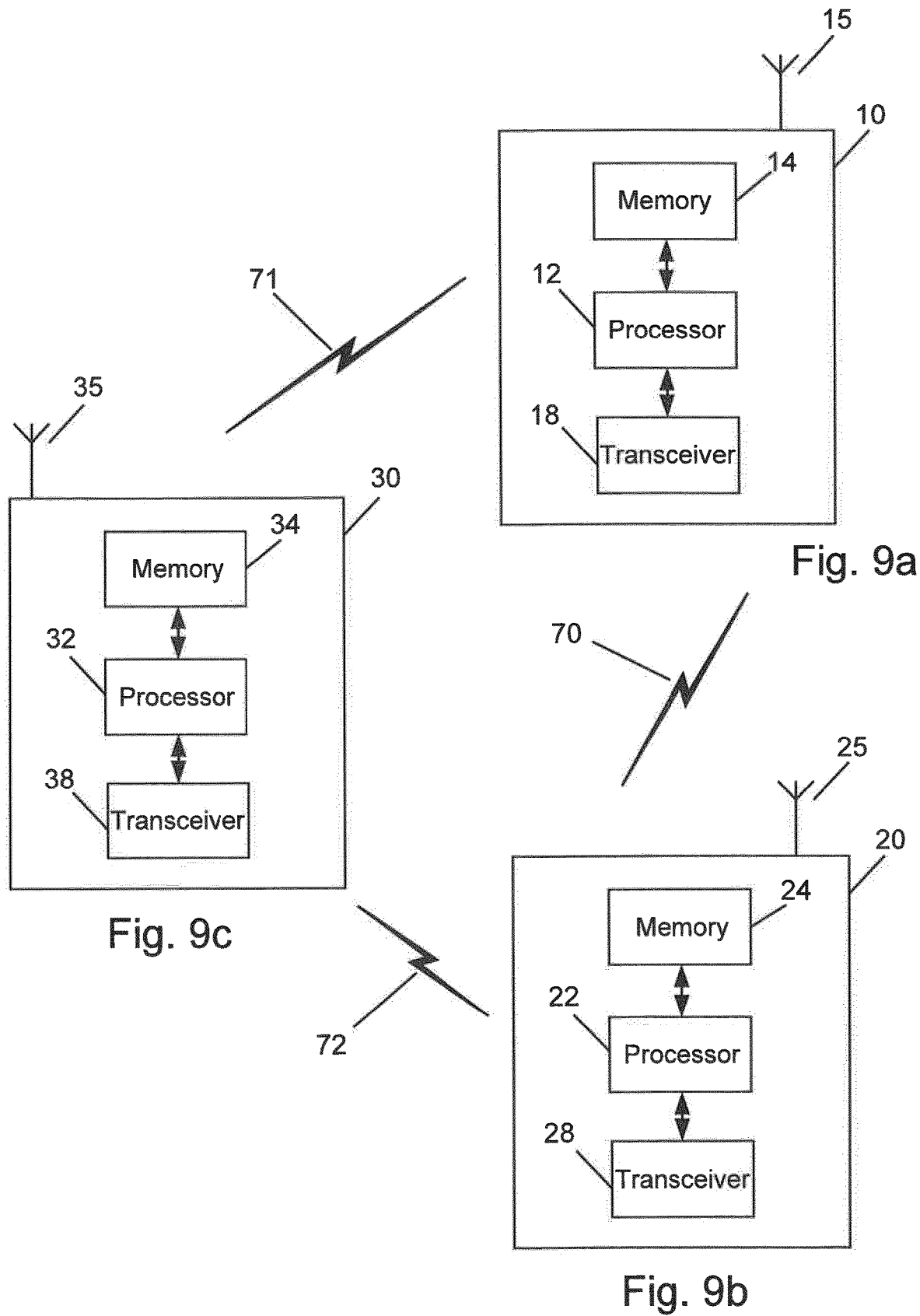
FIG. 9*a* illustrates an example block diagram of an apparatus, according to an embodiment.
FIG. 9*b* illustrates an example block diagram of an apparatus, according to an embodiment.
FIG. 9*c* illustrates an example block diagram of an apparatus, according to an embodiment.

FIG. 9a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, WLAN access point, serving gateway (SGW), and/or mobility management entity (MME) associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a.

As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, CU of a gNB, SGW, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram illustrated in FIG. 6. For instance, in some examples, apparatus 10 may correspond to or represent serving gNB(s) 602 and/or selected network entity 603. In certain embodiments, apparatus 10 may be configured to perform a procedure for the selecting a synchronization source and the configuring of the determined synchronization for a system.

In one embodiment, apparatus 10 may be controlled by memory 14 and processor 12 to setup and configure a UE connection and user contexts for an IAC system, and to configure at least one TS-RB for a UE(s). In certain embodiments, apparatus 10 may be controlled by memory 14 and processor 12 to specify and store the IAC system related user contexts, and to initiate and manage along with radio connection setup and reconfiguration of individual UEs belonging to the same IAC system, starting from the first activated UE. In some embodiments, apparatus 10 may be controlled by memory 14 and processor 12 to receive information on the IAC system related user contexts, from a UE or AMF, for example.

In some embodiments, the IAC system related user contexts may include one or more of a unique ID of the IAC system common to all impacted UEs, required timing precision for E2E application level synchronization across all impacted UEs, communication characteristics of expected synchronized events such as a predefined ID of the protocol, sizes of the messages used for E2E communications corresponding to an expected event, etc. Service requirements of the IAC system and UEs thereof may also be configured to the serving RAN in terms of QoS parameters. As discussed above, the IAC system may come with a PTP based TSN, and the IAC system related user contexts may include or be represented by the contexts of PTP and TSN flows, and corresponding UEs as TSN end devices. In this regard, QoS requirements of an individual TSN flow can be incorporated and mapped on some proper QoS profile of the serving network configured for a corresponding TS-RB, for instance. That is, proper QoS class(es) and corresponding QoS class identifier(s) (QCI(s)) may be provided for setting up and configuring TS-RB(s) to serve TSN flow(s) of the IAC system.

In an embodiment, depending on the IAC system related user contexts, the serving network may decide if it is needed to provide the TS-RB with PDCP level time synchronization for an individual UE, as well as across one or more impacted UEs, of the IAC system. According to some embodiments, this decision can be made dynamically on the basis of individual TSN flows and UEs as TSN end devices, according to QoS requirements mapped on QCI and/or QoS parameters thereof. In certain embodiments, apparatus 10 may be controlled by memory 14 and processor 12 to define and configure a common ID for that at least one TS-RB across the targeted UE group. The common ID can be a LCID or a C-RNTI, for example.

Then, an AMF or SMF, for instance, may select and/or configure a network entity, such as apparatus 10, to provide the master PDCP synchronization source for all configured TS-RBs in serving UEs of the IAC system. In some embodiments, when apparatus 10 is the selected network entity, apparatus 10 may be controlled by memory 14 and processor 12 to determine synchronization on TS-RBs for the considered IAC system and to distribute the initial reference timing as well as configure the synchronized timing granularity for the PDCP level synchronization periodically or on a need basis to one or more of the serving gNB(s) for the IAC system.

According to some embodiments, where apparatus 10 is a serving gNB, apparatus 10 may be controlled by memory 14 and processor 12 to further distribute the reference timing and synchronized timing granularity for the PDCP level synchronization to one or more of the impacted UEs being served by apparatus 10. In some embodiments, this may be realized using either RRC signalling in C-plane or PDCP signalling over individual TS-RBs or additional RBs established for the purpose of TS-RB synchronization in U-plane or L1 mechanism like TA.

FIG. 9b illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, in certain embodiments, apparatus 20 may include serving network nodes or functions of an IAC system, such as AMF or SMF.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a serving network nodes or functions of an IAC system, such as AMF or SMF. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIG. 6. As an example, apparatus 20 may correspond to serving network function(s) 604 (e.g., AMF/SMF) illustrated in FIG. 6. In example embodiments, apparatus 20 may be configured to perform a procedure for the selecting a synchronization source and the configuring of the determined synchronization for a system.

According to example embodiments, apparatus 20 may be made aware of an IAC system that requires application level synchronization with a specified timing precision across identified UE(s) of the IAC system being served. In an embodiment, the serving RAN may setup and configure UE connection and user contexts for the IAC system, and to configure at least one TS-RB for the UE(s). In certain embodiments, apparatus 20 may be controlled by memory 24 and processor 22 to specify and store the IAC system related user contexts at the serving RAN, and to initiate and manage along with radio connection setup and reconfiguration of individual UEs belonging to the same IAC system, starting from the first activated UE. In some embodiments, apparatus 20 may be controlled by memory 24 and processor 22 to inform the serving RAN of the IAC system related user contexts.

In some embodiments, apparatus 20 may be controlled by memory 24 and processor 22 to configure service requirements of the IAC system, and UEs thereof, to the serving RAN in terms of QoS parameters. The IAC system may come with a PTP based TSN, and therefore the IAC system related user contexts may include or be represented by the contexts of PTP and TSN flows, and corresponding UEs as TSN end devices.

In an embodiment, apparatus 20 may be controlled by memory 24 and processor 22 to, depending on the IAC system related user contexts, determine whether to provide the TS-RB with PDCP level time synchronization for an individual UE, as well as across UEs, of the IAC system. According to some embodiments, this decision can be made dynamically on the basis of individual TSN flows and UEs as TSN end devices, according to QoS requirements mapped on QCI and/or QoS parameters thereof. However, in one embodiment, apparatus 20 may be controlled by memory 24 and processor 22 to provide at least one TS-RB for an individual UE of PTP based TSN, configured for at least PTP flow, which can be coordinated and commonly configured across a targeted group of individual UEs belonging to the same IAC system. In certain embodiments, apparatus 20 may be controlled by memory 24 and processor 22 to define and configure a common ID for the at least one TS-RB across the targeted UE group. The common ID may be a LCID or a C-RNTI, for example.

According to one embodiment, apparatus 20 may be further controlled by memory 24 and processor 22 to select and/or configure a network entity to provide the master PDCP synchronization source for the configured TS-RBs in serving UEs of the IAC system. In some embodiments, the selected network entity may be a serving gNB or a local serving gateway as part of UPF via SMF, for example, as the serving gNB is hosting PDCP peers of TS-RBs for at least some of the relevant UEs or the serving local gateway of UPF is directly interfacing with the TSN of the IAC system. However, the selected network entity can also be a C-plane network entity or NF in 5G, such as AF enhanced to support TSN based IAC applications. In an embodiment, the master synchronization source may then determine synchronization on TS-RBs for the considered IAC system. The master synchronization source of TS-RBs may then distribute the initial reference timing as well as configure the synchronized timing granularity for the PDCP level synchronization periodically or on a need basis to all the involved serving gNB for the IAC system.

FIG. 9c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 9c.

As illustrated in the example of FIG. 9c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 9c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein, such as those illustrated in FIG. 6. As an example, apparatus 30 may correspond to one or more of the UE(s) 601 illustrated in FIG. 6.

According to some example embodiments, a connection and contexts for apparatus 30 may be setup and configured for an IAC system. In an embodiment, apparatus 30 may be configured at least one TS-RB. According to certain embodiments, apparatus 30 may be controlled by memory 34 and processor 32 to receive a synchronization configuration of the IAC system from serving gNBs and/or a network entity hosting the master PDCP synchronization source for the IAC system. For example, the synchronization configuration may include the reference timing and synchronized timing granularity for the PDCP level synchronization. In some embodiments, apparatus 30 may be controlled by memory 34 and processor 32 to receive the synchronization configuration via RRC signalling in C-plane or PDCP signalling over individual TS-RBs or additional RBs established for the purpose of TS-RB synchronization in U-plane or L1 mechanism like TA.

Figure 10A:
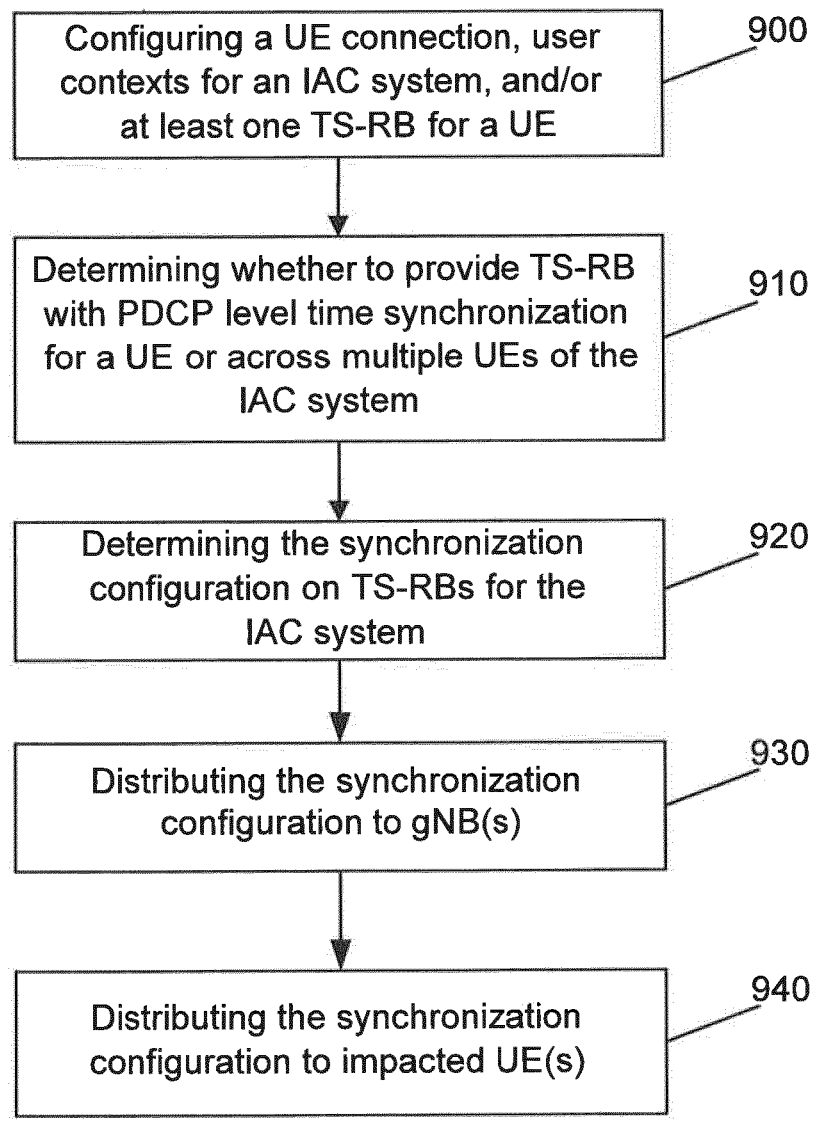
FIG. 10*a* illustrates an example flow diagram of a method, according to one embodiment.

FIG. 10a illustrates an example flow diagram of a method for selecting a synchronization source and configuring of the determined synchronization for a system, according to one example embodiment. In certain example embodiments, the flow diagram of FIG. 10a may be performed by a network node, such as a base station, node B, eNB, gNB, CU of a gNB, SGW, or other access node. For instance, in some example embodiments, the method of FIG. 10a may be performed by a gNB, or CU of a gNB, or local SGW of UPF, as depicted in FIG. 6. In one embodiment, the method may include, at 900, setting up and configuring a UE connection and user contexts for an IAC system, and/or configuring at least one TS-RB for a UE. In certain embodiments, the configuring 900 may also include specifying and storing the IAC system related user contexts, and initiating and managing along with radio connection setup and reconfiguration of individual UEs belonging to the same IAC system, starting from the first activated UE.

In some embodiments, the method may include receiving information on the IAC system related user contexts, from a UE or AMF, for instance. According to certain embodiments, the IAC system related user contexts may include one or more of a unique ID of the IAC system common to all impacted UEs, required timing precision for E2E application level synchronization across all impacted UEs, communication characteristics of expected synchronized events such as a predefined ID of the protocol, sizes of the messages used for E2E communications corresponding to an expected event, etc. In an embodiment, the configuring 900 may also include configuring service requirements of the IAC system and UEs thereof to the serving RAN in terms of QoS parameters. As the IAC system may include a PTP based TSN, the IAC system related user contexts may include or be represented by the contexts of PTP and TSN flows, and corresponding UEs as TSN end devices. In this regard, QoS requirements of an individual TSN flow can be incorporated and mapped on some proper QoS profile of the serving network configured for a corresponding TS-RB, for example. As such, the configuring 900 may include providing proper QoS class(es) and corresponding QCI(s) for setting up and configuring TS-RB(s) to serve TSN flow(s) of the IAC system.

In an embodiment, the method may include, at 910, determining whether to provide the TS-RB with PDCP level time synchronization for an individual UE, and/or across multiple impacted UEs, of the IAC system. According to one example, the determining 910 may be based on the IAC system related user contexts. According to some embodiments, the determining 900 can be made dynamically on the basis of individual TSN flows and UEs as TSN end devices, according to QoS requirements mapped on QCI and/or QoS parameters thereof. In certain embodiments, the method may include defining and configuring a common ID for that at least one TS-RB across the targeted UE group. The common ID can be a LCID or a C-RNTI, for example.

According to certain embodiments, an AMF or SMF, for instance, may select and/or configure a network entity to provide the master PDCP synchronization source for all configured TS-RBs in serving UEs of the IAC system. In some embodiments, the method may then include, at 920, determining synchronization on TS-RBs for the IAC system and, at 930, distributing the synchronization configuration, which may include the initial reference timing as well as configured synchronized timing granularity for the PDCP level synchronization, periodically or on a need basis to one or more of the involved serving gNB(s) for the IAC system.

According to some embodiments, the method may also include, at 940, distributing the synchronization configuration that may include the reference timing and synchronized timing granularity for the PDCP level synchronization to one or more impacted UEs. In some embodiments, the distributing 940 may be realized using either RRC signalling in C-plane or PDCP signalling over individual TS-RBs or additional RBs established for the purpose of TS-RB synchronization in U-plane or L1 mechanism like TA.

Figure 10B:
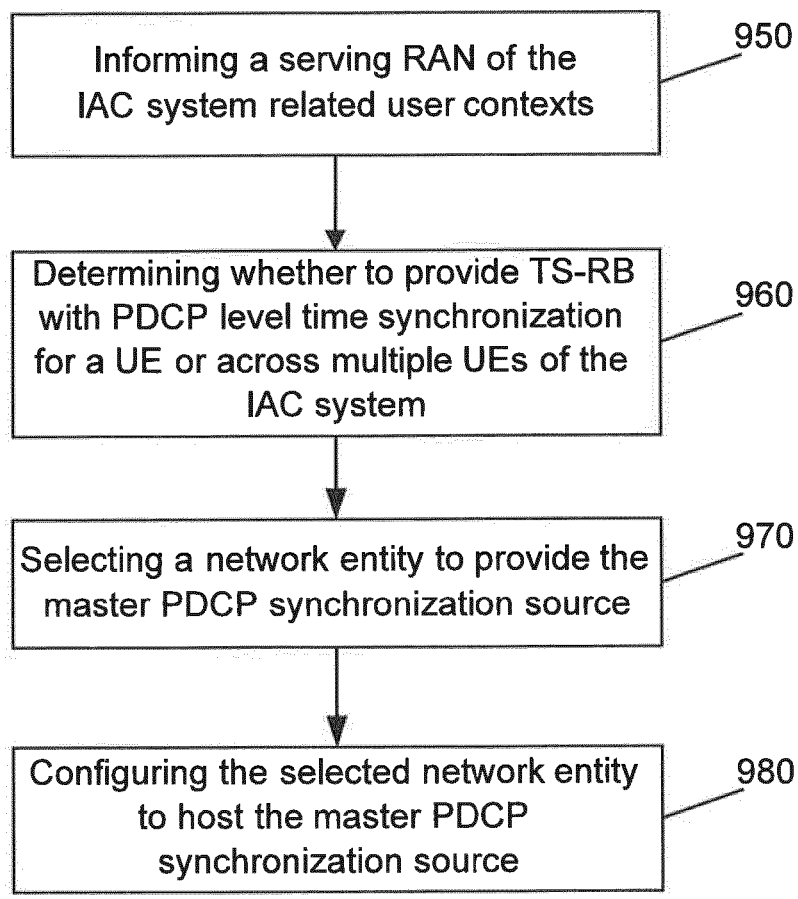
FIG. 10*b* illustrates an example flow diagram of a method, according to an embodiment.

FIG. 10b illustrates an example flow diagram of a method for selecting a synchronization source and configuring of the determined synchronization for a system, according to an example embodiment. In certain example embodiments, the flow diagram of FIG. 10b may be performed by a network entity, such as a serving network entity or function, for example an AMF or SMF. According to some embodiments, the network entity may be aware of an IAC system that requires application level synchronization with a specified timing precision across identified UE(s) of an IAC system being served. In one embodiment, the method may include, at 950, informing a serving RAN of the IAC system related user contexts. In an embodiment, the serving RAN may setup and configure UE connection and user contexts for the IAC system, and configure at least one TS-RB for the UE(s). In certain example embodiments, the informing 950 may further include storing the IAC system related user contexts at the serving RAN, and initiating and/or managing radio connection setup and reconfiguration of individual UEs belonging to the same IAC system, starting from the first activated UE.

In some embodiments, the method may include configuring service requirements of the IAC system, and UEs thereof, to the serving RAN in terms of QoS parameters. The IAC system may come with a PTP based TSN, and therefore the IAC system related user contexts may include or be represented by the contexts of PTP and TSN flows, and corresponding UEs as TSN end devices.

In an embodiment, the method may include, at 960, determining whether to provide the TS-RB with PDCP level time synchronization for a UE and/or across UEs of the IAC system, for example depending on the IAC system related user contexts. According to some embodiments, the determining 960 may be made dynamically on the basis of individual TSN flows and UEs as TSN end devices, according to QoS requirements mapped on QCI and/or QoS parameters thereof. In one embodiment, the method may include providing at least one TS-RB for an individual UE of PTP based TSN, configured for at least PTP flow, which can be coordinated and commonly configured across a targeted group of individual UEs belonging to the same IAC system. In certain embodiments, the method may include defining and configure a common ID for the at least one TS-RB across the targeted UE group. The common ID may be a LCID or a C-RNTI, for example.

According to one embodiment, the method may include, at 970, selecting a network entity to provide the master PDCP synchronization source for the configured TS-RBs in serving UEs of the IAC system. The method may then include, at 980, configuring the selected network entity to host the master PDCP synchronization source. In some embodiments, the selecting 970 may include selecting a serving gNB or a local serving gateway as part of UPF via SMF, for example. However, in certain embodiments, the selecting 970 may include selecting a C-plane network entity or NF in 5G, such as AF enhanced to support TSN based IAC applications. In an embodiment, the master synchronization source may then determine synchronization on TS-RBs for the IAC system. The master synchronization source of TS-RBs may then distribute the initial reference timing as well as configure the synchronized timing granularity for the PDCP level synchronization periodically or on a need basis to all the involved serving gNB for the IAC system.

Figure 10C:
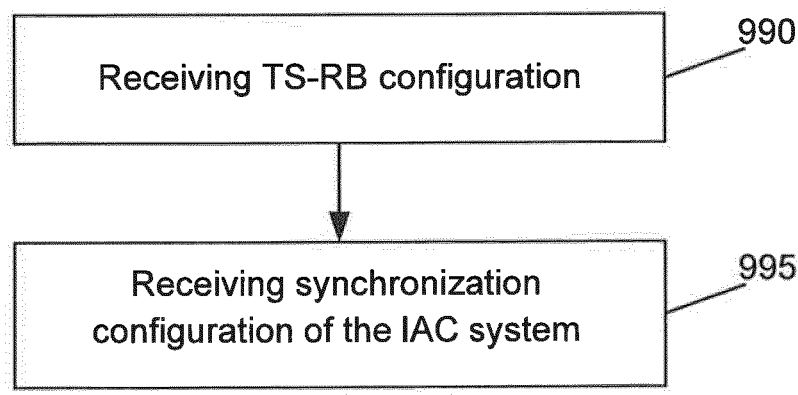
FIG. 10*c* illustrates an example flow diagram of a method, according to an embodiment.

FIG. 10c illustrates an example flow diagram of a method for selecting a synchronization source and configuring of the determined synchronization for a system, according to an example embodiment. In certain example embodiments, the flow diagram of FIG. 10c may be performed by a UE, mobile station, mobile equipment, IoT device, or the like. In one embodiment, the method may include, at 990, receiving a configuration for an IAC system and at least one TS-RB. According to certain embodiments, the method may also include, at 995, receiving a synchronization configuration of the IAC system from serving gNBs and/or a network entity hosting the master PDCP synchronization source for the IAC system. For example, the synchronization configuration may include the reference timing and synchronized timing granularity for the PDCP level synchronization. In some embodiments, the receiving 995 may include receive the synchronization configuration via RRC signalling in C-plane or PDCP signalling over individual TS-RBs or additional RBs established for the purpose of TS-RB synchronization in U-plane or L1 mechanism like TA.

Therefore, certain example embodiments provide several technical improvements, enhancements, and/or advantages. For example, certain embodiments may ensure that the packet delay of the radio access link up to a PDCP level can be synchronized whenever needed for PTP based TSN, is symmetric and deterministic in both UL and DL directions for an individual UE as well as group of UEs, and can be adapted to actual requirements of the belonging TSN and IAC system. An embodiment may compensate for UL/DL delay asymmetricity and delay jitter caused by, for example, fronthaul transport, radio propagation, possible radio retransmissions at lower layers (MAC and RLC), or reception diversities (MIMO and multi-connectivity). As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20 or apparatus 30), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method comprising:
configuring, with a network node, a user equipment connection and user contexts for an industrial automation and control system or configuring at least one time synchronized radio bearer for a user equipment;
determining synchronization configuration for the industrial automation and control system or for the user equipment;
determining whether to provide the at least one time synchronized radio bearer with packet data convergence protocol level time synchronization for an individual user equipment, or across multiple impacted user equipment, of the industrial automation and control system; and distributing the synchronization configuration periodically or on a need basis to one or more serving network nodes of the industrial automation and control system or to the user equipment.

2. The method according to claim 1, wherein the synchronization configuration comprises at least one of initial reference timing or configured synchronized timing granularity for a packet data convergence protocol level synchronization.

3. The method according to claim 1, further comprising distributing the synchronization configuration to one or more impacted user equipment.

4. An apparatus comprising:
at least one processor; and
at least one non-transitory memory comprising computer program code,
the at least one memory and computer program code configured, with the at least one processor, to cause the apparatus at least to:
configure a user equipment connection and user contexts for an industrial automation and control system or configuring at least one time synchronized radio bearer for a user equipment;
determine synchronization configuration for the industrial automation and control system or for the user equipment;
determine whether to provide the at least one time synchronized radio bearer with packet data convergence protocol level time synchronization for an individual user equipment, or across multiple impacted user equipment, of the industrial automation and control system; and
distribute the synchronization configuration periodically or on a need basis to one or more serving network nodes of the industrial automation and control system or to the user equipment.

5. The apparatus according to claim 4, wherein the synchronization configuration comprises at least one of initial reference timing or configured synchronized timing granularity for a packet data convergence protocol level synchronization.

6. The apparatus according to claim 4, wherein the at least one memory and computer program code are configured, with the at least one processor, to cause the apparatus at least to distribute the synchronization configuration to one or more impacted user equipment.

* * * * *